United States Patent [19]
Azar

[11] Patent Number: 5,385,307
[45] Date of Patent: Jan. 31, 1995

[54] CRYOGENIC TIRE RECYCLING SYSTEM

[76] Inventor: Essa T. Azar, 5523 Orr Rd., Monroe, N.C. 28110

[21] Appl. No.: 173,124

[22] Filed: Dec. 27, 1993

[51] Int. Cl.⁶ ............... B02C 18/26; B02C 23/18; B02C 23/40; B02C 21/00
[52] U.S. Cl. .................................. 241/41; 241/65; 241/DIG. 31; 241/DIG. 37
[58] Field of Search .............. 241/101.4, 65, 270, 241/272, DIG. 31, DIG. 37, 199.7, 199.9, 199.12, 38, 41

[56] References Cited

U.S. PATENT DOCUMENTS

| | | | |
|---|---|---|---|
| 797,202 | 8/1905 | Hodge | 241/272 |
| 3,995,816 | 12/1976 | Motek | 241/DIG. 37 X |
| 4,025,990 | 5/1977 | Lovette, Jr. | 241/DIG. 37 X |
| 4,342,647 | 8/1982 | McMillan et al. | 241/DIG. 37 X |
| 4,405,090 | 9/1983 | Wakeem | 241/DIG. 31 X |
| 4,813,614 | 3/1989 | Moore et al. | 241/DIG. 37 X |

FOREIGN PATENT DOCUMENTS

| | | | |
|---|---|---|---|
| 15750 | 5/1978 | Japan | 241/DIG. 37 |
| 1675109 | 9/1991 | U.S.S.R. | 241/DIG. 37 |
| 1684062 | 10/1991 | U.S.S.R. | 241/DIG. 31 |

*Primary Examiner*—Timothy V. Eley
*Attorney, Agent, or Firm*—Michael I. Kroll

[57] ABSTRACT

The raw material in used tire carcasses is reclaimed by cutting the tire into quarter segments and freezing the segments with liquid nitrogen in a controlled environment freezing chamber. Rotary air locks pass material to and from the chamber. Steel and fiber materials are removed in a stripping chamber where the frozen rubber both broken into smaller chunks. A robot arm with magnets and hooked fingers removes the fiber and steel. The rubber chunks are then pressed through dies to reduce the size to a uniform rubber crumb. The press consists of multiple pointed fingers in registration with multiple sized holes in a screen type die. The rubber crumb is removed with a suction device and dried using heat from a closed loop nitrogen cycle on the way to collection containers.

10 Claims, 3 Drawing Sheets

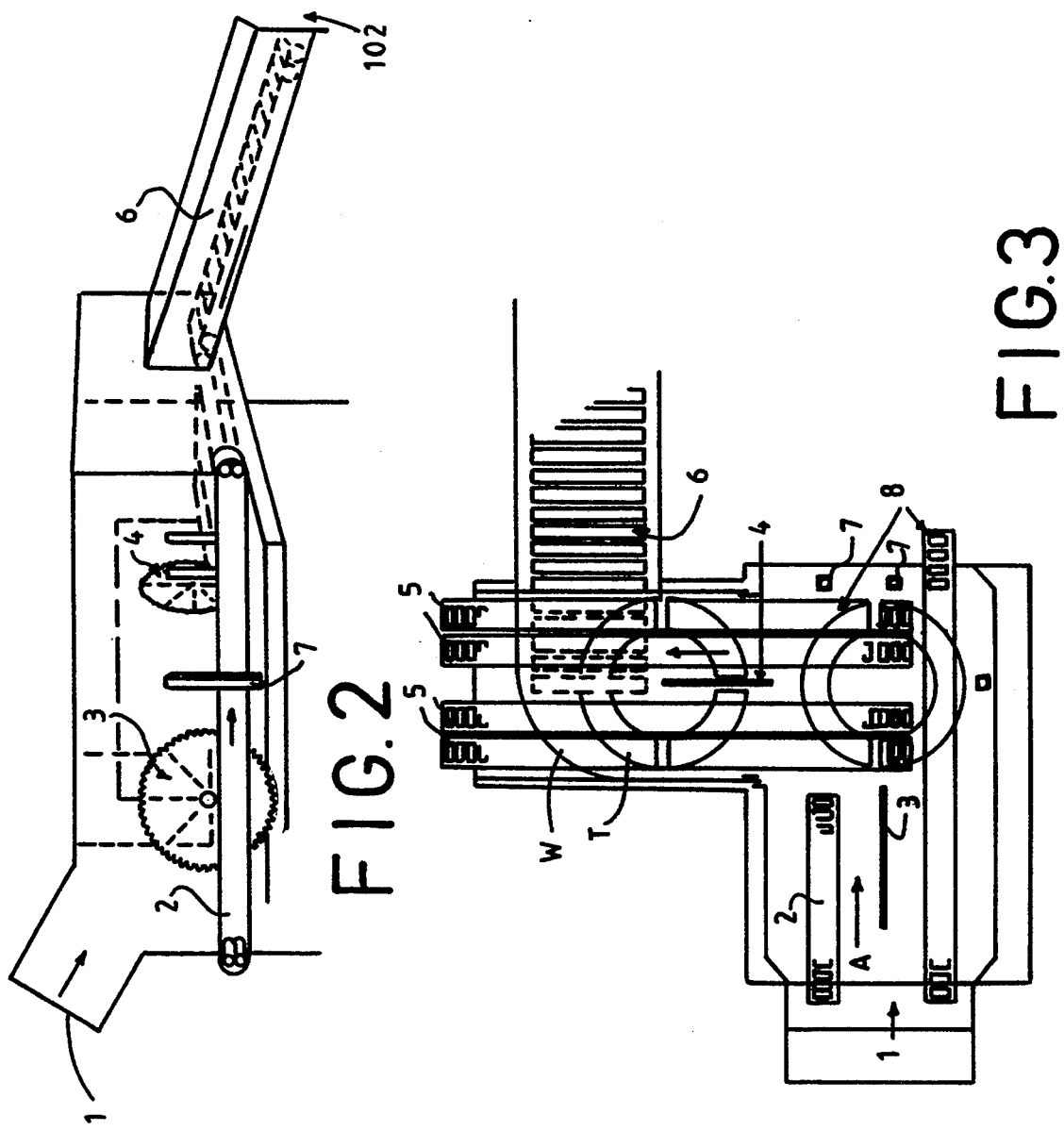

CRYOGENIC TIRE RECYCLING SYSTEM

BACKGROUND OF THE INVENTION

1. Field of the Invention

This invention relates broadly to the fields of manufacturing and construction and more particularly to the provision of new general purpose manufacturing and construction elements made from discarded pneumatic tire materials. It also relates to the fields of environmental preservation and waste disposal, more specifically to recycling persistent non-biodegradable materials. Significant contributions are made to all the above fields by providing recycled, useful, and inexpensive materials which are easily made directly from a previously nearly indestructible item of scrap material causing worldwide disposal problems. The primary benefits to the environmental preservation and waste disposal industry are: (1) that recycled products are made from every part of the discarded item thus not creating more waste; (2) that the transformation to very useful products is done with very little energy expenditure; (3) that the entire process is virtually pollution free; and (4) that precious and dwindling forest resources may be preserved because some of the end products produced are contemplated to adequately replace wood in many applications. The very toughness that makes old tire carcasses a difficult disposal problem makes the rubber crumbs produced by this process ideal for an additive to asphalt and paving compositions. The rubber crumbs are also useful as an extender and impact modifier in rigid plastics. It is well known the multitude of plastic products that replace products previously made from environmentally precious wood. Siding for houses is but one example that immediately comes to mind. The artisan will no doubt be able to perceive many other products that may be made with the new raw materials produced in accordance with the principles of this invention. It will become immediately evident that the unique physical properties of the raw material elements produced in the manner herein disclosed will provide important benefits in many areas. The finished article of manufacture may take many forms as will be seen in the remainder of this specification.

As such it will be appreciated that the potential uses are myriad. A comprehensive listing of all the possible fields to which this invention may be applied is limited only by the imagination and is therefore not provided herein. Some of the more obvious applications and end products are mentioned herein in the interest of providing a full and complete disclosure of the unique advantages to be gained by use of this hitherto unknown recycling process.

Highway construction, manufacturing, environmental preservation, and waste disposal are seen as the fields most likely to gain immediate and substantial benefit from this invention. It is to be understood from the outset that the scope of this invention is not limited to these fields or to the specific examples of potential uses presented hereinafter.

2. Description of the Prior Art

The vulcanized rubber pneumatic tire has proved to be both a blessing and a curse to modern society. We can't live without tires and we are Just beginning to realize we can't live with millions of worn out tire carcasses clogging our landfills and littering our environment. Tires are particularly villainous at prematurely filling dump sites because their hollow toroidal shape is particularly volume consuming and they do not easily compress or nest within one another. About the only way anybody ever has disposed of a used tire has been to burn it. This solution has been so unsatisfactory that it is now illegal in most jurisdictions. Burning tires cause a horrible stench and pollute the air with toxic fumes and particles harmful to all life forms. Even expensive modern incineration devices, complete with scrubbers for the exhaust fumes, are inferior for destroying old tires. The steel belting materials clog the incinerator while the particulate carbon and sulfur compounds tend to foul the scrubbers. Additionally, many incineration devices consume electrical energy which serves primarily to transfer the pollution down the river to where the energy is being produced.

The difficulty in discarding worn out tires and the energy and raw materials required to manufacture them has inspired much effort to refurbish them for further use by retreading. These efforts have spawned entire industries.

However, there are several major problems with producing retreads. The new tread which is to be bonded to the old tire must be produced somewhere. Extensive amounts of energy are used to produce the heat required to bond the new tread to the old tire and, even then, that crucial bonding is not always well accomplished. Both the bonding and the production of a new tread surface are, in many respects, just further examples of shipping the pollution down the river. All told, there is probably as much energy used and pollution produced in the manufacture of a retreaded tire as in the production of the original tire. Here, as in incineration, the steel belts and cords used in modern tires pose severe obstacles to the successful completion of the process. Not all tires can be effectively recycled by the retreading process. For example, if the sidewall or sealing bead is damaged there is no good means to reclaim that tire. The problem here is that a tire must not only have sufficient tread but must also meet stringent standards of flexibility, strength, air permeability, and appearance.

A second alternative of somehow reforming the old tire carcass into other useful articles has been pursued by others with generally limited success. It has been proposed that old tires could be shredded and used as a form of insulation material perhaps mixed with other insulation materials such as vermiculite. This proposal does indeed recognize the important property of extremely low thermal conductivity. The actual shredding process would be extremely difficult especially when steel belts are imbedded in the old tires. Even if the metal were successfully minced up with the rubber it would have to be separated later because it would seriously degrade the thermal insulation properties of the final product. Also, the actual volume of shredded material recovered in this manner would be relatively small with respect to the volume of the original tire carcasses. One would need a mountain of old tires to produce a truckload of shredded rubber insulation material and that truckload might be enough to insulate one house. These relative quantities are, of course, not meant to be precise but merely to point out the fact that there are problems of scale involved with shredding tire carcasses to produce a voluminous product such as household insulation.

Following along with the idea of making some sort of useful product out of the old tire carcasses, there have been numerous proposals to create all kinds of decorative and ornamental articles from the tires. Examples of such uses are flower planters and landscape dividers. Two other applications of limited but useful merit will be familiar to all. Anyone from a farm or rural community will have seen a tire hung from a rope to form the familiar "tire swing". Anyone living on or near a body of water will have seen old tires attached to the sides of docks as bumpers for cushioning the impact of boats. This particular use highlights the important and useful impact absorption properties of the tire material. It has been recorded in the magazine "ABC-American Roofer and Building Improvement Contractor", February, 1978, that old truck tires have been flattened and used as a form of roofing. They are overlapped in an alternating tread-out tread-in pattern to form a watertight seal for this purpose.

Numerous United States Patents have been granted for various and sundry articles made from old tires. The largest group of these Patents are concerned with providing highway safety dividers or barriers thus effectively utilizing the inherent impact energy absorption characteristics of the rubber.

Crude systems for recycling used tire carcasses are old and well known in the art. Many grinders, shredders, mincers, separators, and incinerators have been proposed in the past. All of these systems have suffered from excessive cost and have tended to create excessive air pollution.

Recently, cryogenic embrittlement techniques have been developed to separate the three main components present in tire carcasses. These components are generally rubber, fiber, and steel. Although these techniques represented a considerable advance over prior techniques, they were very expensive and not economically viable. In accordance with conventional terminology, the term rubber used herein may be taken to mean the chemical compositions developed over the years to form the bulk of standard vehicle tires.

The following known prior art has been directed to providing a cryogenic tire material reclamation technique. As will be seen, the simplicity and effectiveness of my invention is not rivaled in the prior art.

U.S. Pat. No. 4,025,990, issued to Lovette, Jr. on May 31, 1977, shows a tire reclamation system using cryogenic freezing as one of its steps. In most respects the system of Lovette bears little similarity to mine. For example, the instant invention uses airlock entry and exit means to the freezing chamber in order to precisely control the freezing environment. The Lovette device requires a significant amount of energy to run the hammermill, grinding mill, and cyclone screen. In contrast, the components of my system are all operated with relatively low energy requirements. Other significant differences will become apparent as the invention is more fully described.

None of the above inventions and patents, taken either singly or in combination, is seen to describe the instant invention as claimed.

SUMMARY OF THE INVENTION

Briefly, the invention comprises an apparatus and method for reclaiming the raw material in used tire carcasses. The first step is cutting the tire into segments of appropriate size for feeding into the apparatus. Presently, it is considered ideal to cut the tire into four quarter segments but my invention is not intended to be limited to this.

Second, the quarters are passed through an air lock into a controlled environment freezing chamber. The freezing chamber is sealed and insulated so as to allow for precise control of temperature, humidity, and pressure. The freezing chamber receives liquid nitrogen from a closed loop liquid nitrogen system, sprays liquid nitrogen onto the quartered tire, collects the nitrogen in recovery nozzles, and returns it to the closed loop. The refrigeration system, used for creating the liquid nitrogen, is not open to the atmosphere and does not contribute to freon pollution.

Third, the frozen tire segment is passed through another rotary air lock to a stripping chamber where it is both broken into smaller chunks and the steel and fiber materials are removed. The stripping chamber features a robot arm with hooked fingers to remove the fibers and steel mesh from the rubber. The overall assemblage of fingers performs the initial breakup process. Steel removal is assisted by magnetic means. The arm deposits the steel and fiber into a collection chute and the rubber chunks exit through another rotary air lock device.

Fourth, the broken up tire chunks are pressed through dies to reduce the size to a uniform rubber crumb. The press consists of multiple pointed fingers in registration with multiple sized holes in a screen type die.

Fifth and finally, the rubber crumb is removed with a suction device and dried using heat from the closed loop nitrogen cycle on the way to collection containers.

Accordingly, it is a principal object of the invention to provide a new and improved cryogenic tire reclamation system which overcomes the disadvantages of the prior art in a simple but effective manner.

It is a major object of this invention to provide a cryogenic tire reclamation system which precuts the tire carcasses into segments of a specified volume. The precut preferably quarters the tires.

It is a major object of this invention to provide a cryogenic tire reclamation system which uses a closed loop refrigeration system to create liquid nitrogen at its cooling phase and dry the final product at its heating phase.

It is another object of the invention to provide a cryogenic tire reclamation system with an environmentally controlled freezing chamber for precise control of temperature, pressure, and humidity.

It is another object of the invention to provide a cryogenic tire reclamation system with a nitrogen spray freezing chamber which recovers the spent nitrogen for reuse in the system thus significantly reducing the amount of nitrogen needed.

It is another object of the invention to provide a cryogenic tire reclamation system with a mechanical magnetic robot arm for stripping and removing steel mesh and fiber from the tire carcass as well as for breaking the tire segment into smaller chunks.

It is another object of the invention to provide a cryogenic tire reclamation system which removes the steel from the tire segments before fine subdivision of the rubber material is begun so as to save energy and allow lighter equipment to be used.

It is another object of the invention to provide a cryogenic tire reclamation system which does not require a grinding process.

It is another object of the invention to provide a cryogenic tire reclamation system with press and die stage for cutting the tire chunks into crumbs of predetermined size.

It is another object of the invention to provide a cryogenic tire reclamation system with a suction device for emptying the tire particles from the press and die stage, drying the particles, and delivering the particles to collection containers.

Finally, it is a general goal of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

The present invention meets or exceeds all the above objects and goals. Upon further study of the specification and appended claims, further objects and advantages of this invention will become apparent to those skilled in the art.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein:

FIG. 2 is a perspective view of the tire cutting and input section of the system.

FIG. 3 is a top view looking downwardly on the tire cutting and input section of the invention.

DETAILED DESCRIPTION OF THE PREFERRED EMBODIMENTS

Figure 1:
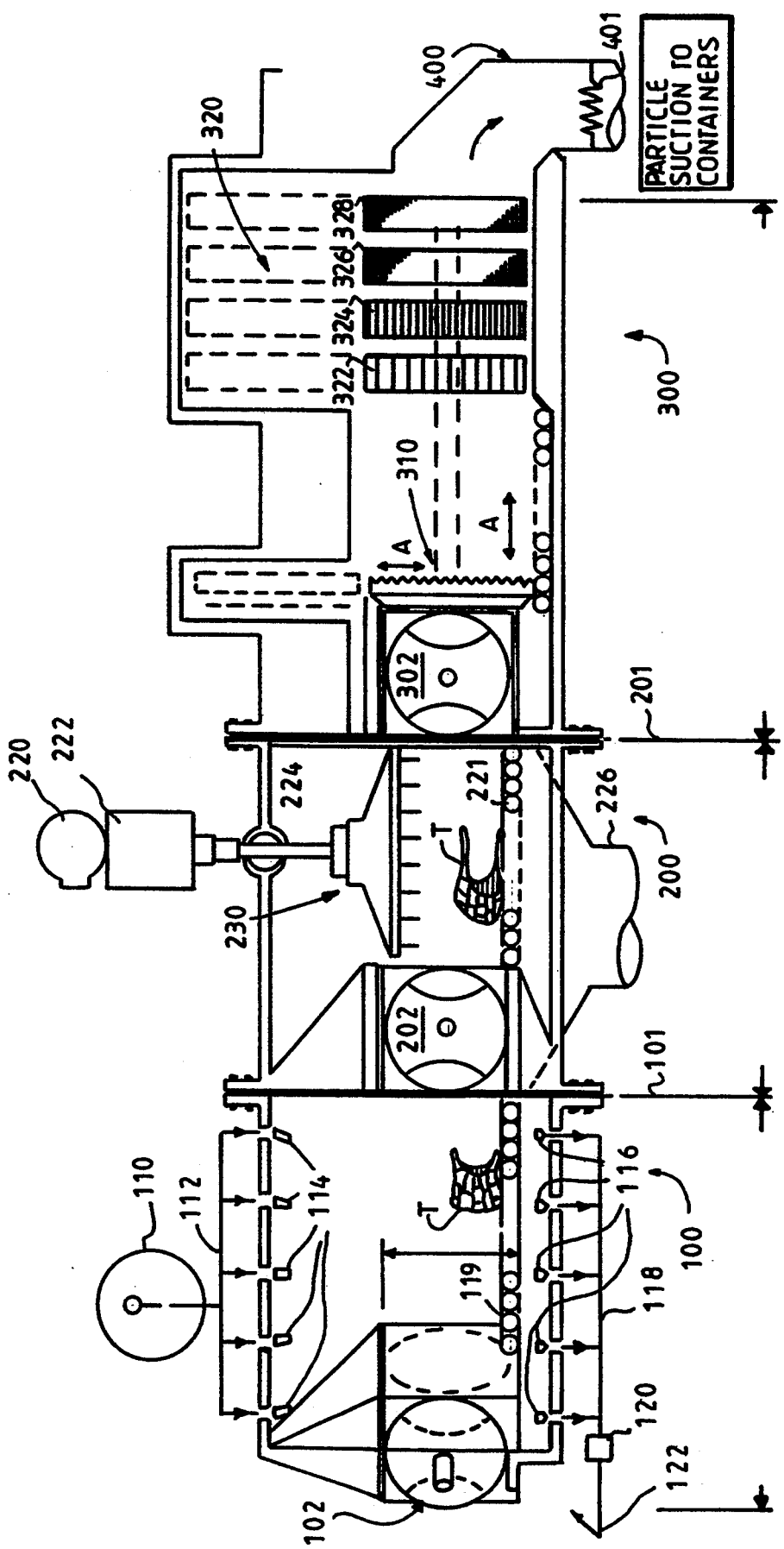
FIG. 1 is a schematic plan view of the overall system of the invention with the input section (to the left) omitted.
Figures 4, 5:
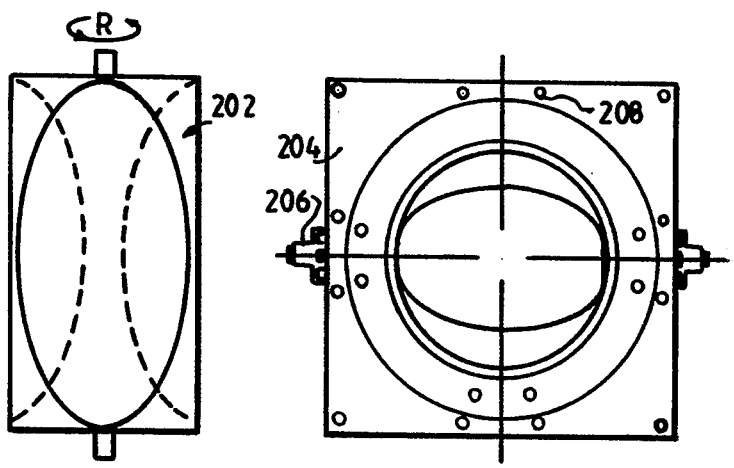
FIG. 4 is a detailed view of the elliptical pockets in a rotor of one of the rotary air lock valves of the invention.
FIG. 5 is a detailed view of a the rotary air lock valve as employed in the invention.

The cryogenic tire reclamation system of the present invention primarily comprises five main sections. The first section is the tire cutting and input section generally shown in FIGS. 2 and 3. The second, third, and fourth sections are all shown in FIG. 1 and are located generally in chambers 100, 200, and 300, respectively. The chambers are separated from one another by airtight insulated walls 101 and 201. For purposes of discussion chamber 100 will be referred to as the freezing chamber, chamber 200 will be referred to as the stripping chamber, and chamber 300 will be referred to as the pressing chamber. A fifth and final section of the device is shown to the far right of FIG. 1 only as a schematic duct 400, which is intended to represent a more or less conventional suction device for vacuuming away the rubber crumb material produced in the preceding sections. Schematically shown in duct 400 is a heater element intended to dry the final product, more fully described later.

Turning first to FIGS. 2 and 3, the tire cutting and input section will be described. Discarded tire carcasses form the raw material for this machine and process. The tires enter the system through input chute 1 at the left hand side of FIGS. 2 and 3. From chute 1 the tires fall on powered belt conveyer 2 to be urged rightward (in the direction of arrow A) through the teeth of cutting blade 3. The just severed halves of the tire then come against stops 7. At this point belt conveyor 5 carries the tire halves perpendicular to the original direction, upward in FIG. 3, past another cutting blade 4. This cuts each of the halves in half, effectively quartering the tire. Power means for belt conveyors 2 and 5 are not shown in detail but are generally located near forked arrow 8. The quartered tire segments T are then transported onward till they contact curved wall W and are urged to fall onto a sloped gravity conveyor 6.

At the lower end of gravity conveyor 6 is located rotary air lock valve 102 which may be seen at the far left of FIG. 1. The discussion now turns to the main machinery of the system shown in FIG. 1. Freezing chamber 100 is fully insulated and sealed from the external environment. The temperature, humidity, and pressure of chamber 100 are all controlled in a manner conventional with controlled environment chambers.

Above chamber 100 is liquid nitrogen tank 110. Liquid nitrogen 110 is fed by insulated piping 112 to multi-directional spray nozzles arranged near the ceiling of chamber 100. The spray itself is precisely controlled by timers and microswitches (not shown). The nozzles spray liquid nitrogen upon tire quarter segment T which has been introduced into chamber 100 through rotary air lock valve 102. Near the floor of chamber 100 are a plurality of nitrogen recovery nozzles 116 which collect the warmed nitrogen and feed it through pipes 118, filter 120, and eventually, back to tank 110.

The details of the rotary air lock valves are well known and will not be presented here. Generally, however, the valve operates so as to introduce material into the chamber while at the same time preventing any direct contact of the interior of the chamber with the external environment. The operation is very similar to the revolving doors commonly seen on building entrances.

After a short time in the liquid nitrogen spray, the cut tire segment T is effectively cooled to a temperature of about 150 degrees below zero fahrenheit. At this temperature the rubber expands and the steel belting contracts so as to form a rather loose conglomeration ready for separation. Powered elevator conveyor 119 raises tire segment T for deposition into the top of second rotary air lock valve 202 for delivery into stripper chamber 200.

Figures 6, 7:
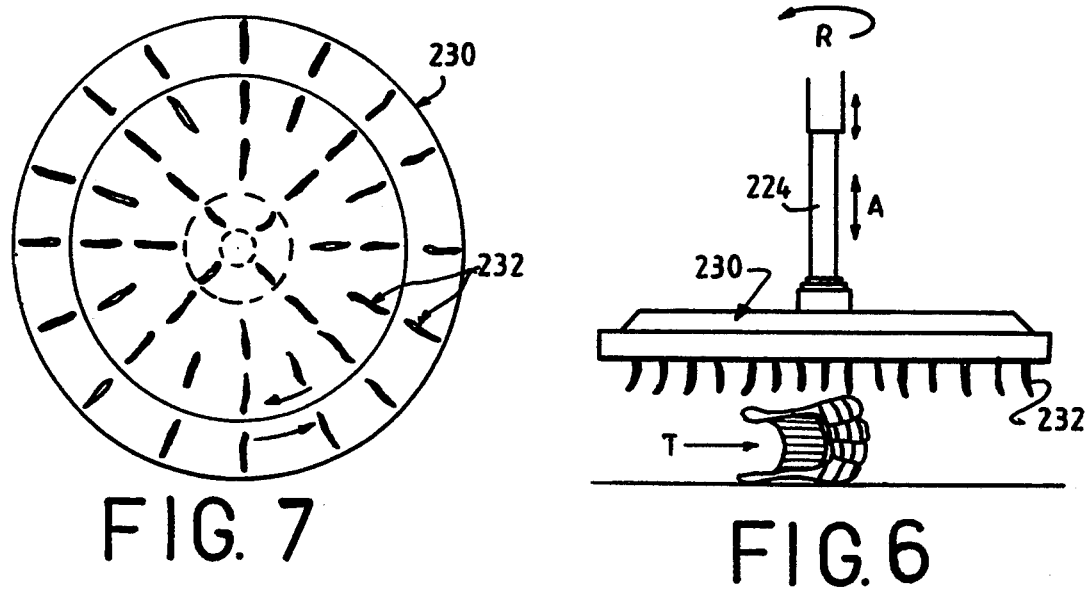
FIG. 6 is a schematic plan view of the robot arm used in the stripper section of the invention.
FIG. 7 is a bottom view of the head of the robot arm of FIG. 6.

Stripper chamber 200 houses stripper robot arm 222 for translation, reciprocation, and rotation of electromagnetic stripper head 230 in the interior of the chamber. The details of the robot arm operating mechanism are conventional and are not given here. Power source 220 of stripper robot arm 222 may be hydraulic or electrical as desired. It is contemplated that a hydraulic robot arm would be best for this application as precise positioning is not a requirement. As mentioned, the stripper head 230 is electromagnetic so that it may be selectively magnetized to assist in removing the steel mesh from tire segment T. The operation of the robot arm is to first lower and gently crush the embrittled tire segment, which shatters somewhat like glass, and then to remove any fibers and steel wires from the rubber shards. This is effectively accomplished by the multiple J-shaped hooks 232 protruding from the bottom of stripper head 230 as Best seen in FIG. 6. Head 230 is lowered to within about a half inch of conveyor 221 as a preliminary maneuver. Then the head may be rotated or oscillated to shake the remaining rubber loose. It is contemplated that the head could first be slowly rotated at about 5 revolutions per minute and gradually speeded up to about 50 revolutions per minute. When the head is then lifted the magnetic attraction assures the steel particles follow and the J-shaped hooks assure the fiber particles follow. The final motion is to translate the lifted particles to a side discharge bin 226 for release. The J-shaped hooks 232 are arranged in a circular pattern around head 230 as best seen in FIG. 7. The separate rubber chunks or shards are then conveyed to the third rotary valve 302 to enter the pressing chamber 300.

Figures 8, 9, 10:
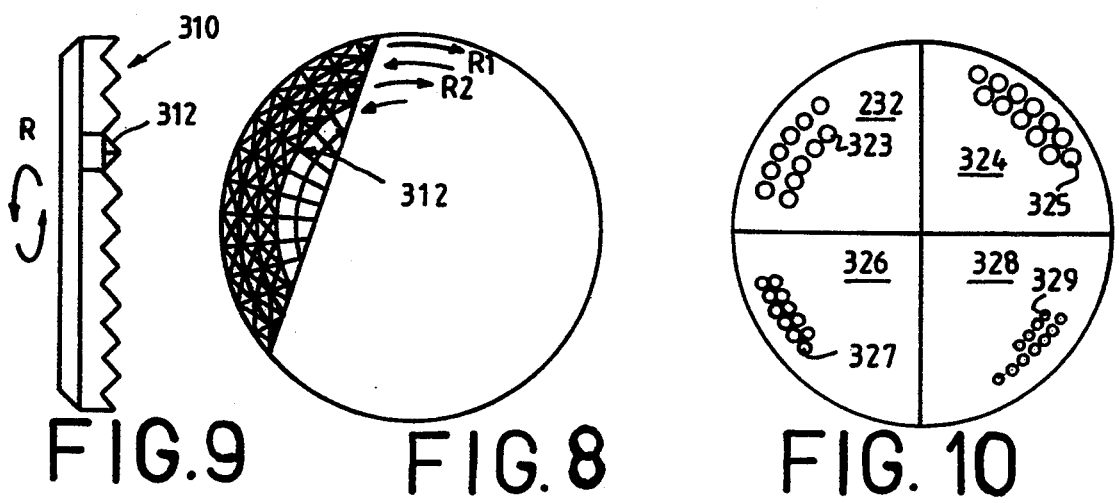
FIG. 8 is an end view, partially detailed, of the press head in the pressing chamber shown near the right of FIG. 1.
FIG. 9 is a side view of the die head of FIG. 8.
FIG. 10 is a schematic end view of the screen die head showing the various sizes and placements of the through holes in the die.

Pressing chamber 300 performs the final reduction of the rubber chunks to the desired uniform size. Press head 310 forces the rubber particles to the right through one or more of the sieve dies 320. There are several dies, ranging from coarse to fine, with holes ranging in size from ¼ inch to 1/32 inch in diameter The dies may be selectively lowered to a use position from a storage position near the top of press chamber 300. It is contemplated that the pressing operation could use more than one die simultaneously, with the left die moving in conjunction with the press head and serving as a press head for the finer one on the right. The holes in the dies are arranged in a circular pattern as best shown in FIG. 10. FIG. 10 is somewhat diagrammatic as the four different hole sizes are shown in the separate quarters of the Figure. It is to be understood that any one circular die would have all its holes of the same diameter. By the time the rubber reaches the pressing chamber the temperature will have risen at least ten degrees, but this will only make the rubber pressing operation easier and improve the uniformity of the final product.

Referring now to FIGS. 8 and 9, the details of press head 310 will be explained. The head is generally circular in shape and is studded with a number of square teeth 312. The ends of the teeth are beveled off to form diamond shaped points. The teeth 312 are arranged to align with holes in the die as the press head is moved to the right in FIG. 1 by conventional hydraulic ram power means (not shown). As best seen in FIG. 8, concentric rows of teeth 312 may be arranged to counter rotate in opposite directions as indicated by arrows R1 and R2. The weight of the press head itself is supported on roller bearings 314 (FIG. 1) reciprocation for ease of operation.

The final operation is shown to the extreme right of FIG. 1, and only very sketchily, since the specific details are relatively conventional. Suction duct 400 is arranged to remove the sized rubber particles from chamber 300 and feed them to containers (not shown). The unique aspect of this operation is the inclusion of heating element 401 to heat and dry the rubber crumbs during their passage. The source of heat for element 401 may be from the heat rejecting phase of the nitrogen liquefaction process or outside electrical power or a combination of both.

Different attachments (shapes and sizes) can be adapted to the robot arm to perform crushing and stripping for different material. The system can be utilized to reclaim non-degradable materials. (plastics by-products, semi-glass additives, wood and paper products)

When cutting the tire before it enters the first chamber, the tire can be cut using several methods in addition to the way specified. For example: laser or press or die. In the future, the system can be modified to accept the entire tire.

A list of reference numerals for the present invention follows:
1 entry chute
2 first belt conveyor
3 cutting blade
4 second cutting blade
5 second belt conveyor
6 gravity feed slope conveyor
7 tire stops
8 power conveyor drive positions
100 freezing chamber
102 first rotary air lock valve
110 liquid nitrogen tank
112 insulated liquid nitrogen piping
114 liquid nitrogen nozzles
116 nitrogen recovery nozzles
118 nitrogen return lines
119 elevating conveyor
120 nitrogen return filter
122 return to nitrogen tank
200 stripper chamber
202 second rotary air lock valve
204 rotary air lock mounting plate
206 rotary air lock trunnion
208 rotary air lock mounting hole
220 robot arm power supply
221 stripper conveyor
222 robot arm controller
224 robot arm
226 side discharge chute
230 electromagnetic stripper head
232 J-shaped stripper hooks
300 pressing chamber
302 third rotary air lock valve
310 press head
312 press head teeth
314 press head support bearings
320 general storage location of sieve dies
322 coarse sieve die
323 holes in coarse sieve die
324 medium sieve die
325 holes in medium sieve die
326 fine sieve die
327 holes in fine sieve die
328 extra fine sieve die
329 holes in extra fine sieve die
400 particle suction to containers
401 heating element
R1 & R2 direction of counter rotating press head teeth
R rotation direction
A directional arrow
T tire quarter segment Obviously, the provided illustrative example is by no means exhaustive of the many possible uses for my invention.

From the foregoing description, one skilled in the art can easily ascertain the essential characteristics of this invention and, without departing from the spirit and scope thereof, can make various changes and modifications of the invention to adapt it to various usages and conditions. For example, the artisan could easily see that waste heat could be applied to the rubber inside the pressing chamber rather than in the outlet suction duct.

It is to be understood that the present invention is not limited to the sole embodiment described above, but encompasses any and all embodiments within the scope of the following claims:

I claim:

1. An apparatus for reclaiming the rubber, fiber, and steel materials of a discarded tire carcass comprising;
    means for cutting the tire carcass into a number of segments of equal volume;
    means for freezing said segments to the point of embrittlement;
    a robot arm capable of rotation, translation, and reciprocation;
    a head on said robot arm for fracturing the rubber in said embrittled tire segments to produce said fractured rubber particles;
    means for separating the fiber and steel from said rubber particles in said composite;
    press means for sizing said rubber particles to a uniform size; and
    suction means for transporting said uniform size particles to containers.

2. The apparatus of claim 1, wherein said means for cutting further comprises;
    first powered conveyor means for transporting the tire carcass in a first direction;
    first cutting means centrally located with respect to said first powered conveyor means for substantially bisecting the tire carcass as it is transported in said first direction;
    second powered conveyor means for transporting the tire carcass in a second direction, substantially normal to said first direction;
    second cutting means centrally located with respect to said second powered conveyor means for substantially bisecting the tire carcass as it is transported in said second direction; whereby
    the tire carcass is transformed into four quarter tire segments.

3. The apparatus of claim 1, wherein said means for freezing further comprises;
    multiple liquid nitrogen spray nozzles for spraying the tire carcasses;
    multiple nitrogen recovery nozzles for recovering the nitrogen; and
    means for resupplying said spray nozzles with the nitrogen recovered by said recovery nozzles.

4. The apparatus of claim 3, wherein said means for freezing further comprises;
    a sealed freezing chamber totally enclosing said spray nozzles, said recovery nozzles, and a tire carcass segment;
    first rotary air lock means for inserting a tire carcass segment into said freezing chamber; and
    second rotary air lock means for removing a tire carcass segment from said freezing chamber; wherein
    the air lock means allow insertion and removal of tire carcass segments while preventing communication of said freezing chamber with the surrounding atmosphere.

5. The apparatus of claim 4, wherein said freezing chamber further comprises;
    means for controlling the temperature, pressure, and humidity within said freezing chamber.

6. The apparatus of claim 1, wherein said means for separating further comprises;
    electromagnetic means on said head for attracting the steel material;
    hook means protruding from said electromagnetic head for snagging the fiber material; and
    discharge chute means for the steel and fiber material.

7. The apparatus of claim 6, wherein said means for separating further comprises;
    means for rotating said head; and
    third rotary air lock means for transporting said fractured rubber particles from said means for separating to said press means.

8. The apparatus of claim 1, wherein said press means further comprises;
    a press head having multiple pointed fingers arranged in concentric rings; and
    die means having multiple uniformly sized apertures arranged in concentric rings corresponding to said concentric rings of said pointed fingers; wherein
    said press head forces said fractured rubber particles through said apertures so as to produce said uniformly sized rubber particles.

9. The apparatus of claim 8, wherein said press means further comprises;
    multiple die means with separate ones of said die means having different sized apertures so as to produce finer or coarser uniformly sized rubber particles, and different ones of said multiple die means are selectively useable in said press means.

10. An apparatus for reclaiming the rubber, fiber, and steel materials of a discarded tire carcass comprising;
    means for cutting the tire carcass into a number of segments of equal volume;
    means for freezing said segments to the point of embrittlement, said means for freezing comprising;
    multiple liquid nitrogen spray nozzles for spraying the tire carcasses;
    multiple nitrogen recovery nozzles for recovering the nitrogen; and
    means for resupplying said spray nozzles with the nitrogen recovered by said recovery nozzles;
    a sealed freezing chamber totally enclosing said spray nozzles, said recovery nozzles, and a tire carcass segment;
    first rotary air lock means for inserting a tire carcass segment into said freezing chamber; and
    second rotary air lock means for removing a tire carcass segment from said freezing chamber; wherein said first and said second air lock means allow insertion and removal of tire carcass segments while preventing communication of said freezing chamber with the surrounding atmosphere
    means for fracturing said embrittled segments to create a composite of rubber particles, fiber, and steel;
    means for separating the fiber and steel from said rubber particles in said composite;
    press means for sizing said rubber particles to a uniform size; and
    suction means for transporting said uniform size particles to containers.

* * * * *